United States Patent [19]

Werner et al.

[11] Patent Number: 4,852,959
[45] Date of Patent: Aug. 1, 1989

[54] ADJUSTABLE FIBER OPTIC BULK POLARIZER

[75] Inventors: Walter V. Werner, Caldwell; Robert L. Lamour, Towaco, both of N.J.

[73] Assignee: Allied-Signal Inc., Morris Township, Morris County, N.J.

[21] Appl. No.: 169,636

[22] Filed: Mar. 17, 1988

[51] Int. Cl.$^4$ ............................................. G02B 6/32
[52] U.S. Cl. ................................. 350/96.18; 350/96.2
[58] Field of Search ............... 350/96.15, 96.18, 96.2, 350/96.21, 396, 397; 250/227

[56] References Cited

U.S. PATENT DOCUMENTS 4,154,529  5/1979  Dyott .......................... 350/96.18 X
4,707,073 11/1987  Kocher ....................... 350/96.18 X Primary Examiner—John D. Lee
Assistant Examiner—John Ngo
Attorney, Agent, or Firm—Howard G. Massung

[57] ABSTRACT

An adjustable fiber optic polarizer (10) comprising tubular member (14) and a bulk polarizer (12) disposed within tubular member (14) and including a two-axes adjusting device (20) disposed in each end of the tubular member (14). Interface device (40) can be positioned in the two-axes adjusting device (20). The two-axes adjusting device (20) supports an interface device (40) which connects the fiber optic to the graded index lens (42). Adjusting device (20) permits two-axes motion of the supported lens (42) with respect to the bulk polarizer (12). The two-axes positioning device (20) can also be rotated with respect to the bulk polarizing device (12) for a maximum optical throughput and polarization extinction ratio.

8 Claims, 2 Drawing Sheets

ADJUSTABLE FIBER OPTIC BULK POLARIZER

CROSS-REFERENCE TO RELATED APPLICATIONS

This application is related to co-pending U.S. patent application Ser. No. 116,984 entitled A Two Axes Micro Angle Positioning Device, assigned to the same assignee as the present application.

BACKGROUND OF THE INVENTION

1. Field of the Invention

This invention relates to fiber optics and more particularly to an adjustable fiber optic bulk polarizer system.

2. Description of the Prior Art

It is sometimes desirable in fiber optic systems to polarize light to be transmitted through optical fibers by the use of an optical polarizer. Prior art polarizers for optical fibers include all fiber polarizers, in which optical fibers are polished and manipulated in order to provide a polarized output of light. Such polarizers are effective but are relatively expensive and difficult to produce.

Nonfiber optic polarizing devices are called bulk polarizers. Bulk polarizers are available but are difficult to maintain in alignment with the optical fibers to maintain low optical losses. A Glan-Thompson polarizer is readily available and is effective in polarizing light, but the light must be collimated in order to achieve a high output and an acceptable ratio of polarized to non-polarized light. Bulk polarizer systems tend to be unstable because of difficulty in maintaining alignment of the component parts. The need for collimation and the need to maintain alignment has made the use of Glan-Thompson polarizers with fiber optic systems difficult.

The Glan-Thompson bulk polarizer is used in association with a fiber optic system by transmitting light from the fiber optic through graded index (GRIN) lenses. The GRIN lenses are constructed to have indices of refraction which collimate light. The GRIN lenses are contacted by the optic fibers so that light transmitted through the fiber is collimated by the GRIN lens. The bulk polarizer and two GRIN lenses are provided. A single mode polarization maintaining optic fiber carrying an input beam is connected to one GRIN lens. A single mode polarization maintaining output optic fiber is in engagement with the other GRIN lens for providing the collimated light output to the fiber optic system. Small changes in angular alignment (0.01 degrees) between the GRIN lenses produce large increases in optical losses.

SUMMARY OF THE INVENTION

Laser light from a single mode optical fiber is collimated by a graded index means to optic single mode fiber interface and is directed onto a bulk polarizer by a two-axes micro-angle adjusting device. Light emerging from the bulk polarizer, which is secured within a cylindrical tubular member, is directed back onto an optic fiber by another graded index lens to optic single mode fiber interface, which is supported by another two-axes micro-angle positioning device. The system is aligned for maximum optical throughput and polarization extinction ratio by adjusting both two-axes micro-angle positioning devices. The two-axes micro-angle positioning devices are adjusted by independently rotating each device in the cylindrical holding tube and by angularly adjusting the front surface through associated adjusting screws. When optimum alignment is achieved, the screws mounting the two-axes micro-angle adjusting devices to the cylindrical holding tubes are tightened.

The graded index lens to optical single mode fiber interface is constructed from a cylindrical member having a hole formed in one end, for accepting the graded index lens, and an elongated channel running the length thereof. Two elongated gauge pins are inserted into the bottom of the channel at the end opposite the hole which receives the graded index lens. A small, 85 micron diameter single mode optical fiber is laid to rest between the two gauge pins and a third gauge pin is provided on top. The graded index lens and the fiber optic and pin gauge configuration is permanently bonded into place using a UV cured epoxy. The three pins in conjunction with the graded index lens provided in an accurately machined hole and channel provides for high accuracy positioning of the single mode fiber with respect to the graded index lens. The graded index lens to single mode optic fiber interface device is then secured in the two-axis micro-angle adjuster.

The two-axes micro-angle adjuster includes a base portion, the outside of which is exposed when the two-axes micro-angle adjuster is positioned in the tubular holding member. The two-axes micro-angle adjuster includes a front surface which can be adjusted along two-axis with respect to the base. Suitable adjusting screws are provided in the exposed portion of the base for two-axis adjusting of the front section. The front section grips the graded index lens end of the interface device containing the graded index lens and optical single mode fiber.

Angular alignment between the two graded index lenses is maintained by the mechanical integrity of the graded index lens to the fiber optic interface and the two-axis micro-angle adjusters which are supported on both ends of the rigid tubular member. Components of the disclosed system can be easily removed and replaced if necessary.

BRIEF DESCRIPTION OF THE DRAWINGS

For a better understanding of the invention, reference may be had to the preferred embodiment exemplary thereof shown in the accompanying drawings in which.

DETAILED DESCRIPTION OF THE PREFERRED EMBODIMENT

Figure 1:
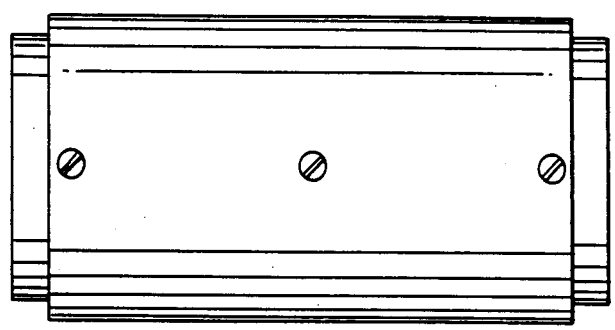
FIG. 1 is a top view of the adjustable fiber optic polarizer.
Figure 2:
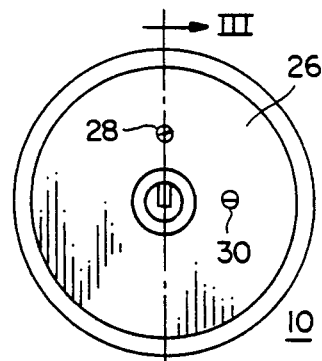
FIG. 2 is an end view of the polarizer shown in FIG. 1.
Figure 3:
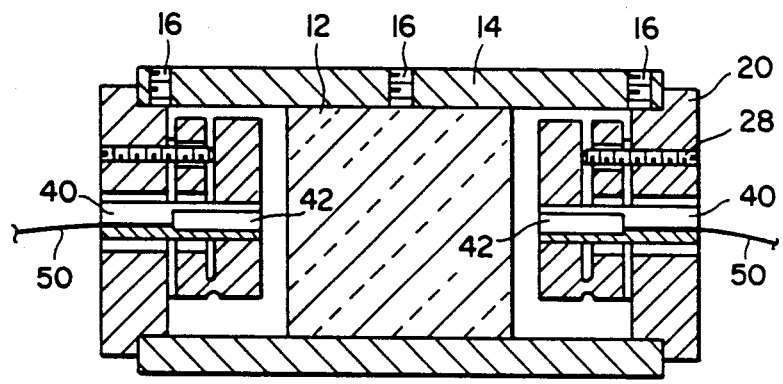
FIG. 3 is a section view taken in FIG. 2 along the line III—III.
Figure 4:
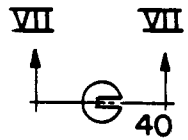
FIG. 4 is an end view of the interface device for the graded index lens to optical fiber transition.
Figure 5:
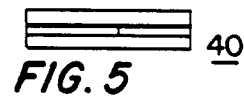
FIG. 5 is a view of the interface device shown in FIG. 4 looking into the top of the elongated channel.
Figure 6:
FIG. 6 is an end view of the interface device looking into the formed hole which receives the graded index lens.
Figure 7:
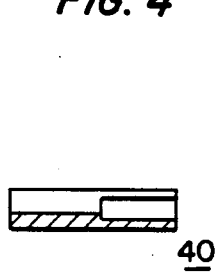
FIG. 7 is a section view of the interface device taken of FIG. 4 along the line VII—VII.
Figure 8:
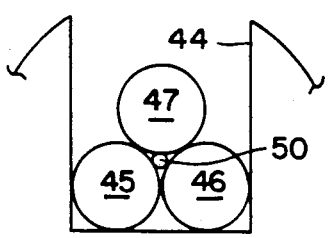
FIG. 8 is an enlarged end view of the channel in the interface device shown in FIG. 4 illustrating placement of the three pin gauges and the retained fiber optic.

Refer now to the drawings, and FIGS. 1 through 3, in particular, there is shown an improved fiber optic bulk polarizer 10 constructed according to the teaching of the present invention. A bulk polarizer 12 such as a Glan-Thompson polarizer, is disposed within a rigid cylindrical tubular member 14.

The use of the word bulk polarizer refers to the fact that polarizer 10 does not use fiber optics in order to perform its function, but instead consists mainly of other elements. The Glan-Thompson polarizer 12 consists of two calcite prisms cemented together such that light passing there through is polarized. The input and output faces of the polarizer 12 are normal to the optical axis, which is the longitudinal axis of cylinder 14. A pair of graded index lenses 42 are cut at a length so that when placed in contact with the selected single mode optical fiber 50 they collimate the light from the fiber 50. The light is directed on to the bulk polarizer 12 by the two-axes micro-angle adjusting device 20. The graded index lens 42 is fit into the hole formed in one end of interface element 40. As described in more detail below a single mode optical fiber is accurately positioned and secured to the graded index lens 42 in the interface device 40.

Interface device 40 is securely held by the front section 22 of the two-axes micro-angle adjusting device 20. The front section 22 of each adjusting device 20 is disposed within rigid tubular member 14. As will be described in more detail below, the front section 22 can be angularly adjusted along two-axes by appropriate set screws 28 and 30 provided in the base portion 26. Further the adjusting device 20 can be angularly rotated within the end of rigid tube 14 for accurate alignment. The polarizer 10 is aligned for maximum optical throughput and polarization extinction ratio by adjusting the set screws, 28, 30 in base 26 and by independently rotating each adjusting device 20 in the end of the cylindrical holding tube 14. When optimum alignment of the pair of graded index lenses 42 is obtained, the mounting set screws 16, holding the two-axis adjuster 20 in place, are tightened.

Refer now to FIGS. 4 through 8, the interface device 40 for the single mode fiber optic to graded index lens interface is illustrated. Interface device 40 has a round hole 41 formed in one end thereof. In operation hole 41 receives the appropriate graded index lens 42. The hole 41 and the graded index lens 42 are approximately 2 mm in diameter. Interface device 20 has a diameter of (0.125 inches) 3.175 mm and a channel (0.044 inches) 1.12 mm wide extends the length thereof. Channel 44 is shown enlarged in FIG. 8. Interface device 40 in the preferred embodiment is (0.543 inches) 1.38 cm long. Two appropriate diameter pin gauges 45 and 46 are provided in the bottom of channel 44. An 85 micron diameter single mode fiber 50 is laid in the space between the two pin gauges 45, 46 and a third pin gauge 47 is placed on top of the two lower pin gauges 45, 46. The single mode optical fiber 50 is positioned in the interface device 40 in contact with the graded index lens 42. The lens/fiber pin gauge configuration is then permanently bonded in place using UV cured epoxy. This interface assembly 40 permits the single mode optical fiber 50 to be positioned very accurately with respect to the graded index lens 42. By accurately machining the location of channel 44 with respect to hole 41, the optical fiber 50 can be exactly positioned at the center of the graded index lens 42. This exact positioning is extremely important in various applications. The interface device 40 can be modified to accept any diameter optical fiber and any diameter graded index lenses. The simple method of joining the graded index lens and the single mode optical fiber allows light to be easily launched into a fiber 50 as is required at the output of polarizer 10 and also collimates light leaving a fiber 50 as is required at the input to polarizer 10.

Figure 9:
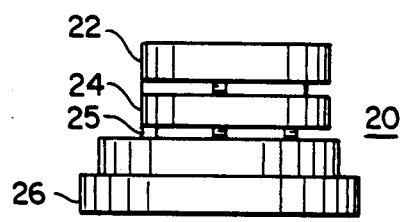
FIG. 9 is a side view of the two-axes micro-angle adjuster.
Figure 10:
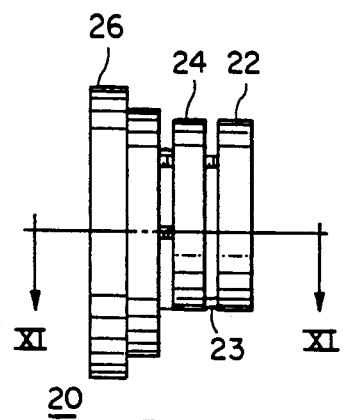
FIG. 10 is a different side view of the two-axis micro-angle adjuster device.
Figure 11:
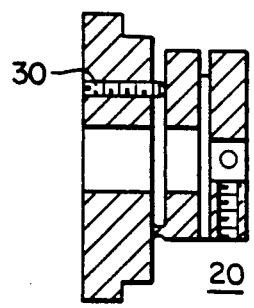
FIG. 11 is a section view of the device shown in FIG. 10 taken along the line XI—XI.

Refer now to FIGS. 9, 10 and 11. There is shown a two-axis micro-angle adjusting device 20 which is suitable for use in bulk polarizer 10. Two-axes micro-angle adjusting device 20 is described in more detail copending in U.S. patent application Ser. No. 116,984 which is herein incorporated by reference. Two-axes adjuster 20 comprises a base section 26 having supported therefrom a central section 24 which in turn supports a front section 22. Central section 24 is supported from base section 26 by an elongated resilient hinge connection 25 and top section 22 is supported from central section 24 by a resilient longitudinally extending hinge section 23. Adjusting screws 28 and 30 contact the front section 22 and the central section 24 respectively for two-axes adjusting of front section 22 with respect to base section 26. The 2 mm diameter graded index lens 42, selfoc SLN-20-0.25, is inserted into the 2 mm diameter, (0.625 inch) 1.59 cm deep hole in the fiber lens retaining and interface 40. After the single mode optic fiber 50 is in place, interface device 40 is secured in the two axis adjuster 20 by a set screw provided in top portion 22.

Graded index lenses 42 have the characteristic that small changes, 0.01 degrees for example, in angular alignment between the graded index lenses 42 produce large increases in optical losses. Prior art devices have experienced optical loss and instability which can be attributed to this angular misalignment effect. The use of the high precision two-axes micro-angle adjuster 20 allows exact angular positioning of the graded index lenses 42 in the bulk polarizer 10. This angular alignment is maintained by the mechanical integrity of both the graded index lens/fiber optic interface in device 40 and the mechanical system construction. Construction of the disclosed polarizer 10 is simple and components can easily be removed and replaced, if necessary. Components of different devices 10 can be interchanged. For example, a bulk polarizer 12 used in a specific device 10 can be removed and used elsewhere. Prior art devices do not afford this flexibility since the graded index lenses are glued directly onto the bulk polarizer crystal.

We claim:

1. A fiber optic polarizer comprising:
    a tubular member;
    a bulk polarizer disposed within said tubular member;
    a first fiber optic to graded index lens interface device disposed in one end of said tubular number;
    a second fiber optic to graded index lens interface device disposed in the other end of said tubular member;
    first adjusting means for two-axes adjusting of the first graded index lens with respect to the bulk polarizer; and
    second adjusting means for two axes adjusting of the second graded index lens with respect to the bulk polarizer.

2. A fiber optic polarizer as claimed in claim 1 wherein said first and second adjusting means each comprise:
- a base member adjustably secured to one end of said tubular members second;
- a central member supported from said base member and disposed within said tubular member;
- a front member supported from said central member; and,
- adjusting screw means accessible from an exposed portion of said base member for two axes adjusting of said front member with respect to said base member.

3. A fiber optic polarizer as claimed in claim 2 wherein said adjusting screw adjusting means comprise;
- a first set screw disposed in said base member which contacts and positions said central member; and,
- a second set screw disposed in said base member which contacts and positions said front member.

4. A fiber optic polarizer as claimed in claim 3 wherein:
- said front member has an opening formed therein for securing said first or second fiber optic to graded index lens interface.

5. A fiber optic polarizer as claimed in claim 4 wherein said first and second fiber optic to graded index lens interface devices each comprise: an elongated cylindrical member having an elongated channel formed therein;
- a hole formed in one end of said elongated cylindrical member for receiving a graded index lens; and,
- three gauge pins disposed in the elongated channel and securing there between a single mode optic fiber in alignment and contact with the graded index lens.

6. A fiber optic polarizer as claimed in claim 1 wherein said first and second fiber optic to graded index lens interface devices each comprise:
- an elongated cylindrical member having an elongated channel formed therein;
- a hole formed in one end of said elongated cylindrical member for receiving a graded index lens; and,
- three gauge pins disposed in the channel and securing there between a single mode optic fiber in alignment and contact with the graded index lens.

7. A fiber optic bulk polarizer system comprising:
- a bulk polarizer supported within a housing;
- a first graded index lens having a single mode optical fiber secured to one end and having the other end disposed in proximity to said bulk polarizer;
- a second graded index lens having a single mode optical fiber secured to one end and having the other end disposed in proximity to said bulk polarizer;
- first adjusting means supporting said first graded index lens from said housing for two axes adjusting of said first graded index lens with respect to said bulk polarizer; and,
- second adjusting means supporting said second graded index lens from said housing for two axes adjusting of said second graded index lens with respect to said bulk polarizer.

8. A fiber optic bulk polarizer system as claimed in claim 7 wherein said first and second adjusting means each comprise:
- a base member adjustably secured to one end of said housing;
- a central members supported from said base member and disposed within said housing;
- a front member supported from said central member; and,
- screw adjusting means disposed within said base member and accessible from outside of said housing for two axes adjusting of said front member with respect to said housing.

* * * * *